US007335302B2

(12) United States Patent
Bartsch et al.

(10) Patent No.: US 7,335,302 B2
(45) Date of Patent: Feb. 26, 2008

(54) CENTRIFUGE BASKET AND CENTRIFUGE

(75) Inventors: Eckhard Bartsch, Evessen (DE); Hans-Heinrich Westendarp, Braunschweig (DE)

(73) Assignee: Braunschweigische Maschinenbauanstalt AG, Braunschweig (DE)

( * ) Notice: Subject to any disclaimer, the term of this patent is extended or adjusted under 35 U.S.C. 154(b) by 184 days.

(21) Appl. No.: 11/350,790

(22) Filed: Feb. 10, 2006

(65) Prior Publication Data

US 2006/0207926 A1 Sep. 21, 2006

(30) Foreign Application Priority Data

Feb. 18, 2005 (EP) .................................. 05003507

(51) Int. Cl.
*B04B 7/18* (2006.01)
*B04B 3/00* (2006.01)
*B01D 33/11* (2006.01)
*B01D 33/42* (2006.01)

(52) U.S. Cl. ................................ 210/360.1; 210/380.1

(58) Field of Classification Search ............. 210/360.1, 210/380.1, 402

See application file for complete search history.

(56) References Cited

U.S. PATENT DOCUMENTS 3,662,947 A * 5/1972 Pause .......................... 494/43
5,378,364 A * 1/1995 Welling ................... 210/512.1

FOREIGN PATENT DOCUMENTS

| | | |
|---|---|---|
| DE | 120 671 C | 5/1901 |
| DE | 19 16 280 B1 | 6/1970 |
| GB | 1294939 A | 1/1972 |

OTHER PUBLICATIONS

"Importance of Area and Location of Molasses Drainage Holes in Basket of Continuous Centrifugal Machines", Atul Kumar Agrawal et al., Proc. S.T.A.I. 63: 98-109 (2001).

"Elektrotechinik, Maschinenbar, Waermewirtschaft", Zuckerindistrie 129 (2004) Nr.4 (Abstract of "Importance of Area and Location of Molasses Drainage Holes in Basket of Continuous Centrifugal Machines", Atul Kumar Agrawal et al., Proc. S.T.A.I. 63: 98-109 (2001)).

European Search Report dated May 23, 2005 for EP 05 00 3507.

* cited by examiner

*Primary Examiner*—Fred G. Prince
(74) *Attorney, Agent, or Firm*—Greenblum & Bernstein, P.L.C.

(57) ABSTRACT

A centrifuge basket having a basket casing, on the inside of which is formed a working screen for separating off suspension liquid. The basket casing has openings of elliptical design. The openings are offset in relation to one another in the axial direction and in the circumferential direction of the basket casing. The contours of the openings overlap in the axial direction such that the basket circumference is covered by openings.

25 Claims, 2 Drawing Sheets

CENTRIFUGE BASKET AND CENTRIFUGE

CROSS REFERENCE TO RELATED APPLICATION

This application claims priority under 35 USC §119 to European Application 05003507.0, which is incorporated by reference in its entirety herein.

FIELD OF THE INVENTION

The invention relates to a centrifuge basket having a basket casing, on the inside of which is arranged a working screen for separating off suspension liquid. The basket casing has openings of elliptical design. The invention also relates to a centrifuge having such a basket casing and to a method of producing a centrifuge basket.

BACKGROUND DESCRIPTION

DE 19 16 280 B1 discloses a periodically operating centrifuge which is intended for centrifuging off contents and in which a working screen is arranged on the inner wall of the centrifuge basket. The run-off holes in the central part of the basket casing are of elliptical design, and the axis of the focal points of the ellipse is located at right angles to the basket axis.

It is known that use is made, in continuously operating centrifuges, of conical baskets which have outlet openings in the form of a hole or of a slot. The publication entitled "Importance of area and location of molasses drainage in baskets of continuous centrifugal machines" by Agrawal and Malik in Proc. S.T.A.I. 63 (2001) Manufacturing Section 98-109 describes that the existing 8 mm holes in a basket are supplemented by additional holes and slots being introduced into this basket. This achieves an opening surface area of 2.6% in relation to the basket surface area, which resulted in an improved throughput and in improved sugar quality.

SUMMARY OF THE INVENTION

The present invention is related to a centrifuge basket, and a method for producing the same, by means of which the process of separating off suspension liquid is optimized, in particular in order to improve the separation of solid and liquid in crystal suspensions.

This is achieved according to the invention in that the openings are introduced into the basket casing by an abrasive method and are offset in relation to one another in the axial direction and in the circumferential direction of the basket casing, with the result that the contours of the openings overlap in the axial direction of the basket casing and the basket circumference is covered by openings. The openings are arranged in the basket casing such that the contours of the openings overlap and, on account of their offset arrangement, form something of an all round slot. It is thus possible to achieve a very large opening ratio and to allow very short flow paths for the suspension liquid. Similarly, the particular arrangement of the openings means that it is not possible for suspension liquid separated off by way of the working screen to run along the inner wall of the basket casing without coming into contact with an opening. The elliptical design of the opening, which is elongate in a circumferential direction and preferably constitutes an ellipse in the geometrical sense, allows a reduction in the stresses in the region of the openings and optimum utilization of the material characteristics. The elliptical openings result in uniform stress distribution within the basket casing, the highest stresses occurring axially at the vertex between the focal points of the ellipse. The offset arrangement of the openings means that these may be arranged very close together, with the result that the basket casing can have a maximally large opening ratio with a maximal number of openings. In the case of baskets hitherto produced from sheet metal, an opening ratio of only 4% is possible on a cost effective basis. The basket according to the invention allows an opening ratio of up to 20% to be produced on a cost effective basis. It is likewise possible to adapt the opening ratio over the axial direction of the basket casing to the quantity of liquid accumulating in each case. In addition, the overall weight of the basket decreases and the efficiency of the centrifuge increases. This is further assisted by the openings being made by means of an abrasive method, since there are only minimal changes to the material structure in the cutting zone and, in particular, there is no embrittlement in the peripheral region of the openings. The shape and the arrangement of the openings and the fact that they are introduced by an abrasive method make it possible to operate very thin walled centrifuge baskets at high rotational speeds because the stresses occurring in the basket casing move within an admissible range despite the large opening ratio which can be achieved. The high rotational speeds form an important requirement in the separation of viscous crystal suspensions.

A development of the invention provides that the contours of the openings overlap in a range of 5% to 30% of their surface area, e.g. they have a degree of overlap of 10%, in order to ensure that suspension liquid which has been separated off does not run through between the openings.

The main axis of the elliptical openings, that is to say the axis on which the focal points of the ellipse lie, is preferably at an angle of 35° to 135° to the basket axis, preferably at an angle of 90° to the basket axis, since the high rotational speeds give rise to a predominantly axially running flowing movement of the suspension liquid. Different angles can allow for changing operating conditions or use purposes.

A development of the invention provides that the openings are arranged one behind the other in the circumferential direction as a row of openings. The necessary interspaces are present between the openings. An axially offset row of openings is staggered about the basket axis such that the contours of the openings overlap the interspaces and project beyond the interspaces, with the result that two sub-regions of the openings are located one behind the other as seen in the axial direction.

In order to produce a precise separation effect, the rows of openings are arranged in groups, in particular in pairs, preferably three to four paired rows are formed in a basket casing, this making it possible to separate the run-off products in accordance with their purity. Provision is made here for the spacings between the rows of openings to be smaller than or equal to the spacings between the groups or paired rows, with the result that the suspension liquid which has been separated off can be led away in accordance with its purity. The closer the group is arranged to the periphery of the centrifuge basket, the purer is the suspension liquid which is separated off. It is likewise provided that the degrees of overlap of the openings in a paired arrangement differ from paired row to paired row, for example that, immediately following the run-in of suspension in the bottom region of the basket, there is a smaller overlap than at the periphery of the centrifuge basket. Alternatively, provision may be made for a larger overlap, and thus a larger opening ratio, in the bottom region in order for the syrup accumulating to be separated off as quickly as possible. On account of the low mechanical loading in the bottom region of the basket, it is possible to achieve very large degrees of overlap.

The basket casing is expediently of frustoconical design, the centrifuge basket opening conically. The material thickness of the basket casing is preferably 3 mm to 25 mm, in particular 5 mm, this making it possible to achieve a very lightweight configuration of the basket casing and the centrifuge basket as a whole.

A development of the invention provides that the openings have an axis ratio of 1:3 to 1:10, the shorter axis being oriented in the axial direction. The horizontal spacing between two openings is approximately ⅔ of the length of the longer, horizontal axis of the openings, the spacing between the longer, horizontal axes of two rows of openings in the axial direction in relation to one another being approximately ⅔ of the length of the horizontal axis of the opening.

In order for production of the basket casing to be as low-stress as possible, the openings are introduced by abrasive cutting using a water jet. Alternatively, it is possible to use similarly low-stress cutting methods, for example erosion, to form the elliptical openings.

The method of producing a centrifuge basket according to the invention provides for the openings to be introduced into the material of the basket casing by abrasive cutting, the openings being introduced into the material either prior to the individual parts of the basket casing being joined together or once the basket casing has been assembled to form a truncated cone. The introduction of the openings prior to the individual parts being joined together has the advantage of the usually planar workpieces being machined, which is advantageous in terms of workpiece handling and tool alignment. If the openings are introduced into the finished truncated cone, these may, from time to time, be better aligned in relation to one another.

DETAILED DESCRIPTION OF THE INVENTION

Figure 1:
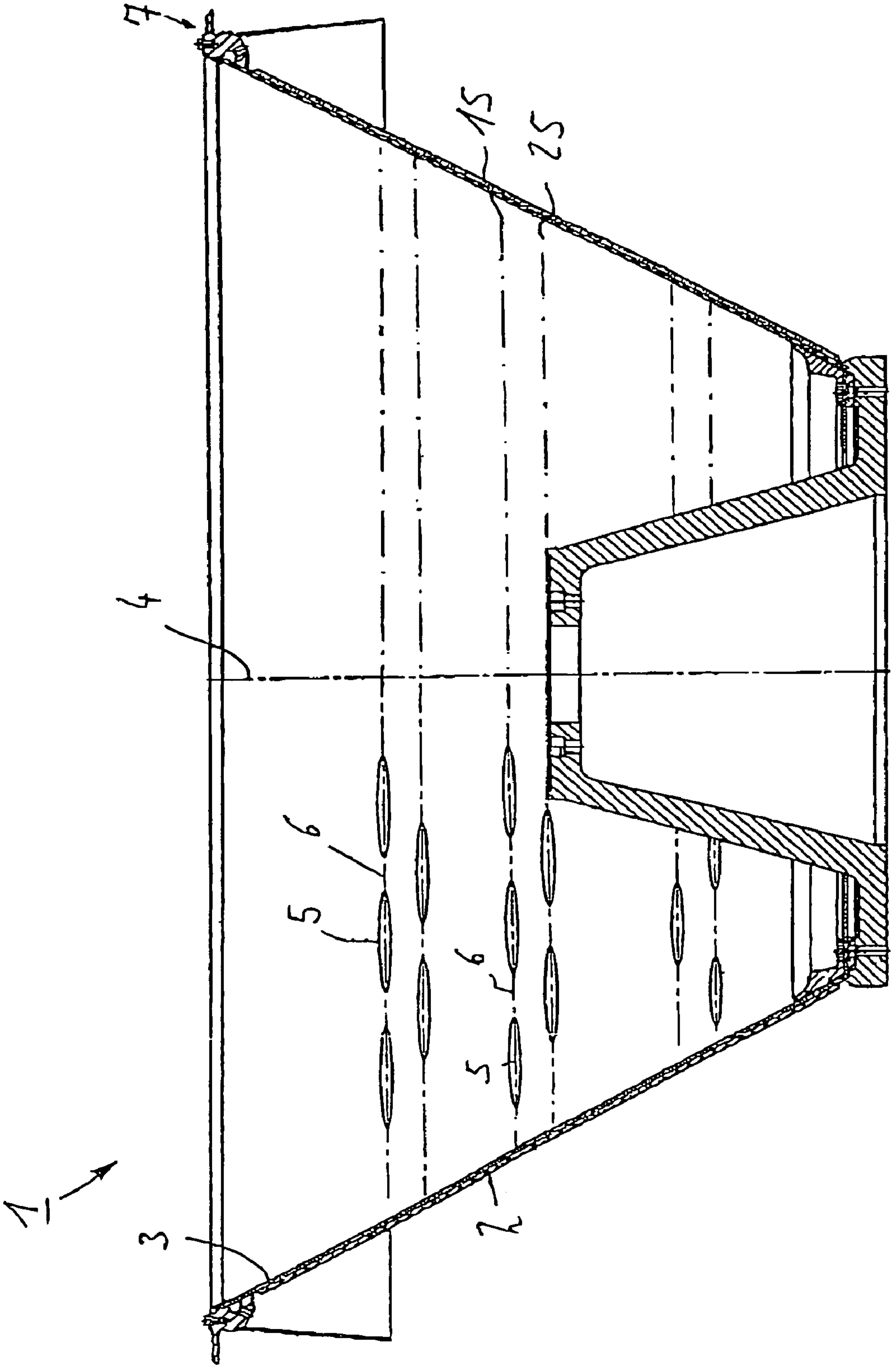
FIG. 1 shows an aspect of the invention.
Figure 2:
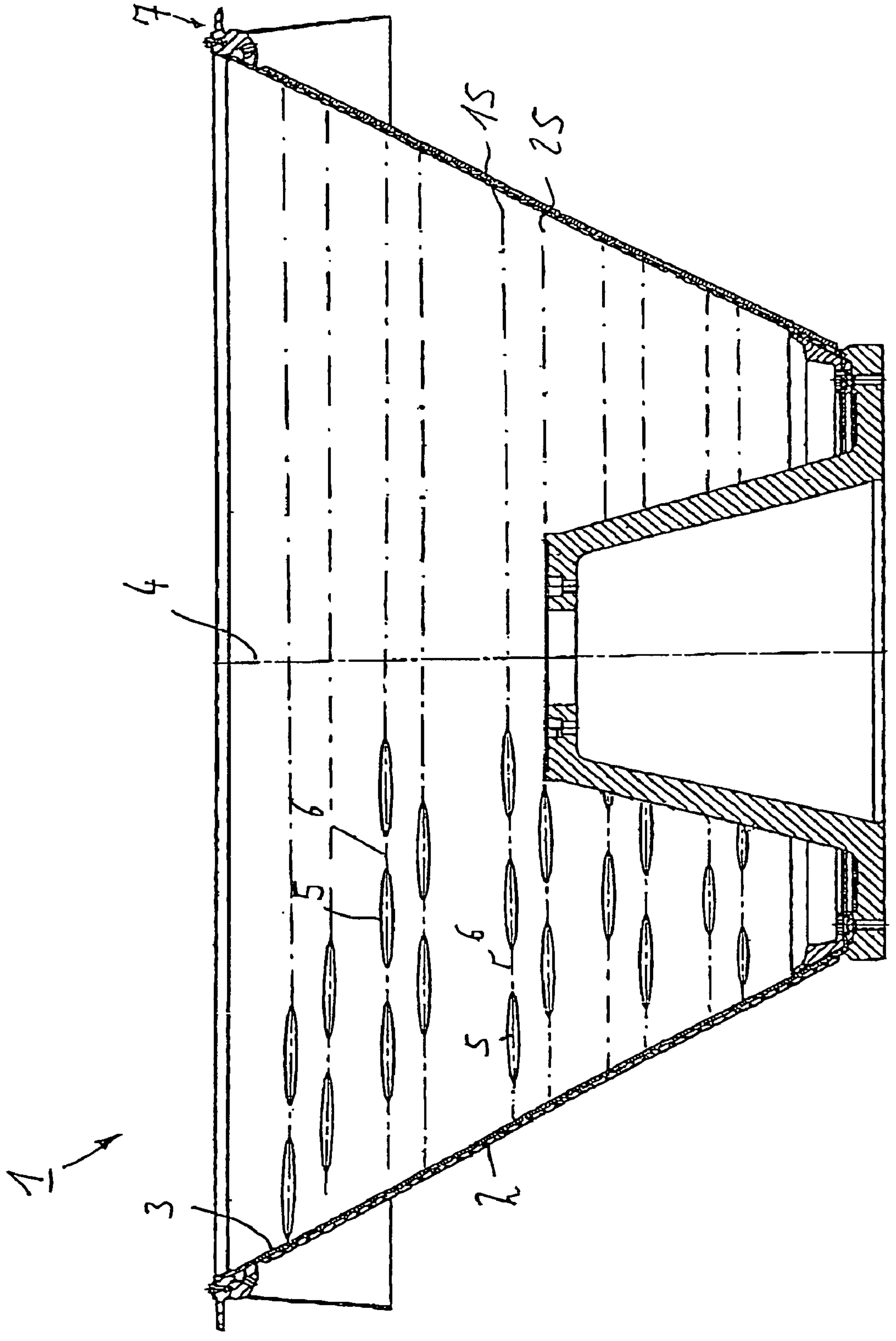
FIG. 2 shows another aspect of the invention.

An exemplary embodiment of the invention is explained in more detail hereinbelow with reference to attached FIGS. 1 and 2. Like designations relate to like components.

The figures show a continuously operating centrifuge basket 1 having a conically upwardly opening basket casing 2, on the inside of which is arranged a screen 3 and the top termination of which forms a basket ring 7. The screen 3 may be designed as a working screen with a support screen or as a bar screen; the important factor is for it to be possible for the suspension liquid to flow out along the inner wall of the basket, with the result that the crystals slide along the screen 3 toward the basket periphery, while the suspension liquid which has been separated off can be led out of the basket 1. The basket casing 2 contains elliptical openings 5, in the exemplary embodiment illustrated in FIG. 1 in three paired rows, and in FIG. 2 in five paired rows. The openings 5 are arranged one behind the other in a circumferential direction of the basket casing 2, with the result that the main axes of the elliptical openings 5, that is to say the axis on which the focal points of the ellipse lie, are located on a circumference and form a first row 15 of openings. Interspaces 6 are provided between the openings 5. The interspaces 6 may be dimensioned differently in the axial direction of the basket casing 2, with the result that the spacing of the openings 5 changes. The closer together the openings 5, the higher is the opening ratio and thus the discharge of liquid; the further apart the openings 5, the smaller is the opening ratio and thus the discharge of liquid.

Openings 5 are likewise located on another circumference offset in the axial direction and form a second row 25 of openings, these openings being staggered in relation to the first row 15 of openings such that the openings 5 cover the interspaces 6. It can likewise be seen that the openings 5 on different circumferences overlap one another, with the result that two opening regions are arranged axially one behind the other. The rows 15, 25 of openings form a group. A plurality of groups are arranged in the axial direction along the basket casing 2, the spacing between the groups being greater than or equal to the spacing between the rows 15, 25. It is thus possible for the suspension liquid to be separated off in a fractionated manner.

During operation of the centrifuge basket 1, that is to say during rotation about the axis 4, the separated-off suspension liquid, which is centrifuged onto the basket casing 2 by way of the working screen 3, moves upward on the basket casing 2 on account of the conical design. The flow path here is essentially linear, with the result that the arrangement of the openings 5 ensures that suspension liquid which has been separated off is always led away through the basket casing 2 by way of the openings 5.

If two rows 15, 25 of openings were to be located one above the other, this would form an all-round slot through which all of the suspension liquid separated off is centrifuged off. Since more suspension liquid accumulates in the bottom region of the basket 1, the opening ratio is greater there than at the basket periphery, which is shown in FIG. 2 by the openings 5, 6 in this region being arranged closer together than in the variant shown in FIG. 1. The centrifuge basket 1 according to FIG. 1 has a smaller opening ratio than the centrifuge basket 1 of FIG. 2, in particular in the bottom region. As an alternative, it is also possible, rather than the rows 15, 25 of openings being arranged in pairs, for the rows 15, 25 of openings to be arranged uniformly with a corresponding angular offset.

In the present exemplary embodiment, the main axes of the openings 5 are formed at right angles to the axis of the centrifuge basket 1, although they may also be offset at an angle of 35° to 135° to the axis 4.

The openings 5 are introduced into the basket wall by an abrasive method, in particular using a water jet, this preventing embrittlement of the peripheral regions of the openings 5 since there are no changes in structure resulting from a massive introduction of heat. It is thus possible to use relatively thin-walled materials for the basket casing 2. The basket casing 2 may consist of sheet-metal material or cast material. Using the centrifuge basket 1 according to the invention, it is possible to separate solids from liquids in an energy-saving manner.

One feature here is that, on account of the high centrifugal forces which can be achieved, the liquid which is separated off is led out of the centrifuge basket as quickly as possible, as a result of which the efficiency of the centrifuge as a whole is further increased since less liquid has to be accelerated. This is also possible, in particular, in that the openings 5, on account of the low stresses in comparison with angular slots, can be arranged very close together and close to the basket base, and a large opening ratio is thus achieved. Accordingly, the accelerated suspension preferably passes out of the centrifuge basket 1 in the bottom region and requires no further acceleration.

It is thus possible for the centrifuge basket 1 to be produced in a material-saving and cost-saving manner since, on account of the arrangement and the design of the openings 5 and the insubstantial changes to structure, the materials can be utilized to the optimum extent. It is thus possible to produce very thin-walled basket casings which, in turn, can be operated at high rotational speeds.

Such a centrifuge basket 1 is provided, in particular, for continuous centrifuging, the arrangement of a plurality of rows 15, 25 of openings located one above the other forming zones, at the top boundaries of which the liquid which has been separated off flows out of the centrifuge basket 1 precisely. This makes it possible for the run-off liquid products to be separated out of the centrifuge basket 1 in accordance with their purity.

One configuration of the invention provides that the horizontal extent of the ellipse is between 44 mm and 60 mm, with a height of 12 mm, with the result that the semi-axis ratio is between 1:3 and 1:10. In the case of a horizontal extent of approximately 60 mm of an opening 5, the spacing between two openings 5 in the horizontal direction is approximately 40 mm, and the spacing of the horizontal axes in the axial direction in relation to one another is likewise approximately 40 mm.

On account of the relatively low notch effect of the elliptical openings 5, the openings 5 may be arranged closer together than is the case for angular openings.

The invention claimed is:

1. A centrifuge basket comprising a basket casing and a working screen arranged on an inside of the casing for separating off suspension liquid, the basket casing having openings of elliptical shape, wherein the openings are introduced into the basket casing by abrasive cutting and are offset in relation to one another both in an axial direction and in a circumferential direction of the basket casing, and contours of the openings overlap in the axial direction, such that a circumference of the basket is covered by the openings.

2. The centrifuge basket as claimed in claim 1, wherein the contours of the openings overlap by 5% to 30% of their surface area.

3. The centrifuge basket as claimed in claim 1, wherein the contours of the openings overlap by 10% of their surface area.

4. The centrifuge basket as claimed in claim 1, wherein the openings are designed as ellipses, and an axis on which focal points of the ellipse lie is oriented at an angle of 35° to 135° to a basket axis.

5. The centrifuge basket as claimed in claim 1, wherein the openings are arranged one behind an other in the circumferential direction of the basket casing as a first row of openings and interspaces are formed between the openings, and wherein an axially offset, second row of openings is formed, the openings of the second row being arranged such that their contours overlap the interspaces.

6. The centrifuge basket as claimed in claim 5, wherein the rows of openings are arranged in groups and the spacing between the groups is greater than or equal to the spacing between the first and second rows of openings.

7. The centrifuge basket as claimed in claim 6, wherein one to eight paired rows are formed in the basket casing.

8. The centrifuge basket as claimed in claim 6, wherein three to four paired rows are formed in the basket casing.

9. The centrifuge basket as claimed in claim 5, wherein a spacing between longer, horizontal axes of two rows of openings in the axial direction in relation to one another is ⅔ of the length of the horizontal axis of the opening.

10. The centrifuge basket as claimed in claim 5, wherein the rows of openings are arranged in pairs and the spacing between the pairs is greater than or equal to the spacing between the first and second rows of openings.

11. The centrifuge basket as claimed in claim 1, wherein a degree of overlap of the contours of the openings changes in the axial direction of the basket casing.

12. The centrifuge basket as claimed in claim 1, wherein an opening surface area in the basket casing in relation to a surface area of the basket casing is between 4% and 20%.

13. The centrifuge basket as claimed in claim 1, wherein an opening surface area is greater in a bottom region of the basket than in a top region of the basket.

14. The centrifuge basket as claimed in claim 1, wherein the basket casing is of frustoconical shape.

15. The centrifuge basket as claimed in claim 1, wherein a material thickness of the basket casing is 3 mm to 25 mm.

16. The centrifuge basket as claimed in claim 1, wherein the openings are introduced into the basket casing by abrasive cutting using water jets.

17. The centrifuge basket as claimed in claim 1, wherein a spacing of the openings changes in the axial direction of the basket casing.

18. The centrifuge basket as claimed in claim 1, wherein the openings have an axis ratio of 1:3 to 1:10, a shorter axis being oriented in the axial direction.

19. The centrifuge basket as claimed in claim 1, wherein a horizontal spacing between two openings is ⅔ of the length of a longer, horizontal axis of the openings.

20. A centrifuge having a centrifuge basket as claimed in claim 1.

21. A method of producing a centrifuge basket as claimed in claim 1, wherein the openings are introduced into the material of the basket casing by abrasive cutting.

22. The method as claimed in claim 21, wherein the openings are introduced into the material of the basket casing by an abrasive method using water jets.

23. The method as claimed in claim 21, wherein the openings are introduced into the basket casing.

24. The method as claimed in claim 23, wherein the basket casing is of frustoconical shape.

25. The centrifuge basket as claimed in claim 1, wherein the openings are designed as ellipses, and an axis on which focal points of the ellipse lie is oriented at an angle of 90° to a basket axis.

* * * * *